June 26, 1928.  1,675,228
E. SCHMIDT
MOISTURE ABSORPTION DEVICE
Filed Nov. 23, 1926
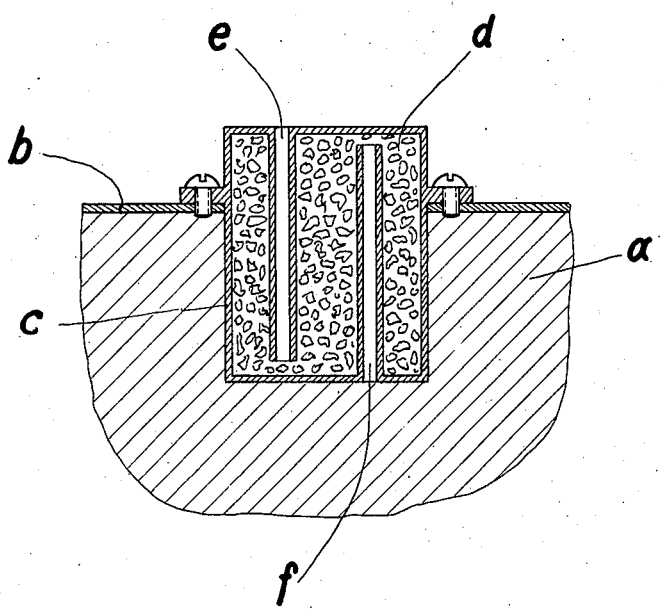
Inventor.
Ernst Schmidt,
by Howard A. Coombs, Atty.

Patented June 26, 1928.

1,675,228

UNITED STATES PATENT OFFICE.

ERNST SCHMIDT, OF DANZIG-LANGFUHR, FREE CITY OF DANZIG, ASSIGNOR OF ONE-HALF TO EDWARD DYCKERHOFF, OF BLUMENAU, NEAR WUNSTORF, HANOVER, GERMANY.

MOISTURE-ABSORPTION DEVICE.

Application filed November 23, 1926, Serial No. 150,365, and in Germany November 30, 1925.

This invention relates to devices for preventing the entrance of moisture into heat insulating devices and has for its object to provide an improved device of this character which shall be of simple construction and effective in operation.

Moisture frequently condenses within or under the insulation of refrigerating apparatus especially if the apparatus is employed for maintaining very low temperatures and this moisture substantially diminishes the insulating properties of the insulation which in many cases is entirely destroyed by the formation of ice therein.

These disadvantages arise from the fact that the casing employed for enclosing the insulation is not sufficiently air-tight so that upon setting the apparatus into operation or upon stopping it and upon interruptions in the operation of the apparatus occurring the temperature of the air in the interstices of the insulation and consequently the volume of this air is varied. Air is therefore alternately expelled from and drawn into the insulation and moisture therefore continually enters the insulation and condenses on the colder parts thereof and as this action occurs repeatedly moisture accumulates in or under the insulation. These disadvantages have been obviated by providing the insulation with an air-tight casing, but such a casing must possess considerable rigidity and be very effectively sealed if it is to attain its object, especially at very low temperatures, when a considerable decrease in pressure occurs owing to the contraction of the cold air within the air-tight casing.

Furthermore, it has hitherto been proposed to provide receptacles containing calcium chloride in closed air chambers as for instance, between the double glass walls of ice safes.

According to the present invention, however, removable and interchangeable cartridge elements containing a hygroscopic substance are mounted in apertures in the air-tight casing of an insulating layer so that moisture is prevented from entering the insulating layer the condensation of water and formation of ice in the insulating layer, thus being effectively prevented.

Equalization of the pressure of the air outside and within the casing is thus permitted so that it is unnecessary that the casing be either of great rigidity or very carefully sealed at the joints. Moreover gradual drying of a somewhat moist insulation will take place as perfectly dry air upon being expelled from the insulation withdraws moisture from the insulation which is absorbed by the hygroscopic substance.

The invention thus enables layers of air to be employed for insulation purposes even at low temperatures this being hitherto impracticable as after a very short time such layers of air became clogged with ice, and as the radiation of heat decreases considerably with the temperature layers of air are of considerable value for insulating bodies at low temperatures. Moreover layers of air possess a very slight heat capacity, so that much greater protection against change in temperature is afforded to apparatus thus insulated. The invention is particularly applicable to installations for liquid air, in which casings having very strong walls are required for the insulation on account of the great difference in temperature, if the entrance of moisture is to be prevented by completely enclosing the air contained in the insulation.

The device for absorbing moisture from the air may be most simply constructed in the form of a removable cartridge element containing a hygroscopic substance such as calcium chloride or phosphorous pentoxide for example, the cartridge element being provided with apertures for the passage of air therethrough. These apertures are preferably in communication with the interior of the cartridge element through passages, in order to obtain the greatest possible protection against entrance of moisture to the insulation. The cartridge elements should be mounted in an air-tight manner in the casing of the insulation, so that air can only enter the insulation through the cartridge element. After a certain time the hygroscopic substance within the cartridge element will become saturated with moisture, and it should then be replaced by another similar element. A used cartridge element may readily be restored to its original condition so that it may be used again by application of heat or by filling it with a fresh charge of hygroscopic substance.

In order that the nature of the invention may be clearly understood a preferred constructional form thereof will now be described by way of example with reference to the single figure of the accompanying drawing.

Referring now to the drawing the insulation *a* which may consist either of a layer of air or porous or other material is surrounded by an air-tight casing *b* a removable cartridge element *c* containing a hygroscopic substance *d*, being secured by a flange or in any other suitable manner to the casing *b* and extending within the casing. Communication between the interior of the cartridge element *c* and the atmosphere is established through passage *e* and with the layer of air or porous or other material constituting the insulation *a* through passage *f*. It will be evident that any air flowing from the atmosphere to the interior of the insulation *a* is freed from moisture by the hygroscopic substance *d* contained by the cartridge element *c*.

Having now described my invention, what I claim as new and desire to secure by Letters Patent, is:

1. The combination with a heat-insulating layer, of a substantially air-tight casing located at one side of said layer and provided with an opening, and a moisture-absorbing element mounted in said opening.

2. The combination with a heat-insulating layer, of a substantially air-tight casing located at one side of said layer and provided with an opening, containing means mounted in said opening and provided with an aperture at one side of said casing and with a second aperture at the other side of said casing, and hygroscopic means within said containing means.

3. The combination with a heat-insulating layer, of a substantially air-tight casing located at one side of said layer and provided with an opening, containing means mounted in said opening and having overlapping inlet and outlet passages, and a hygroscopic means within said containing means.

In testimony whereof I have hereunto set my hand.

Dr. ERNST SCHMIDT.